United States Patent
Enomoto et al.

(10) Patent No.: US 11,675,551 B2
(45) Date of Patent: Jun. 13, 2023

(54) PRINTING SYSTEM INCLUDING SERVER AND PRINTER PRINTING IMAGE BASED ON PRINT JOB STORED IN THE SERVER

(71) Applicant: BROTHER KOGYO KABUSHIKI KAISHA, Nagoya (JP)

(72) Inventors: Katsunori Enomoto, Toyokawa (JP); Satoshi Tanimoto, Nagoya (JP); Yuqing Liu, Nagoya (JP); Kosuke Mori, Handa (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/468,760

(22) Filed: Sep. 8, 2021

(65) Prior Publication Data

US 2022/0100442 A1 Mar. 31, 2022

(30) Foreign Application Priority Data

Sep. 30, 2020 (JP) .............................. JP2020-164740

(51) Int. Cl.
*G06F 3/12* (2006.01)
(52) U.S. Cl.
CPC .......... *G06F 3/1224* (2013.01); *G06F 3/1203* (2013.01); *G06F 3/1238* (2013.01); *G06F 3/1285* (2013.01)
(58) Field of Classification Search
None
See application file for complete search history.

(56) References Cited

U.S. PATENT DOCUMENTS 10,162,584 B1 * 12/2018 Ozawa ................... G06F 3/1231
11,474,765 B2 * 10/2022 Ushiro .................... G06F 3/126
2005/0068566 A1 3/2005 Nishiguchi
2016/0103640 A1 * 4/2016 Tsuchiya ............... G06F 3/1285
358/1.14
2016/0306515 A1 * 10/2016 Hermanson ........... G06F 3/0484

FOREIGN PATENT DOCUMENTS

| JP | 2005-103962 A | 4/2005 | |
|----|----|----|----|
| JP | 2007-034491 A | 2/2007 | |
| JP | 2011-056918 A | 3/2011 | |
| WO | WO-2004053665 A1 * | 6/2004 | ........... G06F 1/3203 |

OTHER PUBLICATIONS

English translation of Patent Application Publication WO-2004053665-A1. (Year: 2004).*

* cited by examiner

*Primary Examiner* — Thomas D Lee

(74) *Attorney, Agent, or Firm* — Scully, Scott, Murphy & Presser, PC

(57) ABSTRACT

A printing system includes a printer, a server device, and a client device. The client device receives identification information of a user, and transmits a print job for an image to be printed to the server device. The print job is associated with a computer name. The computer name specifis the client device and is assigned to the received identification information. The server device stores the print job in a specific folder having a name corresponding to the identification information to which the computer name is assigned and which is associated with the print job. The printer searches a folder provided in the server device to find the specific folder, receives selection of a print job from among one or more print jobs stored in the found folder, receives the selected print job from the server device, and prints an image based on the received print job.

20 Claims, 6 Drawing Sheets

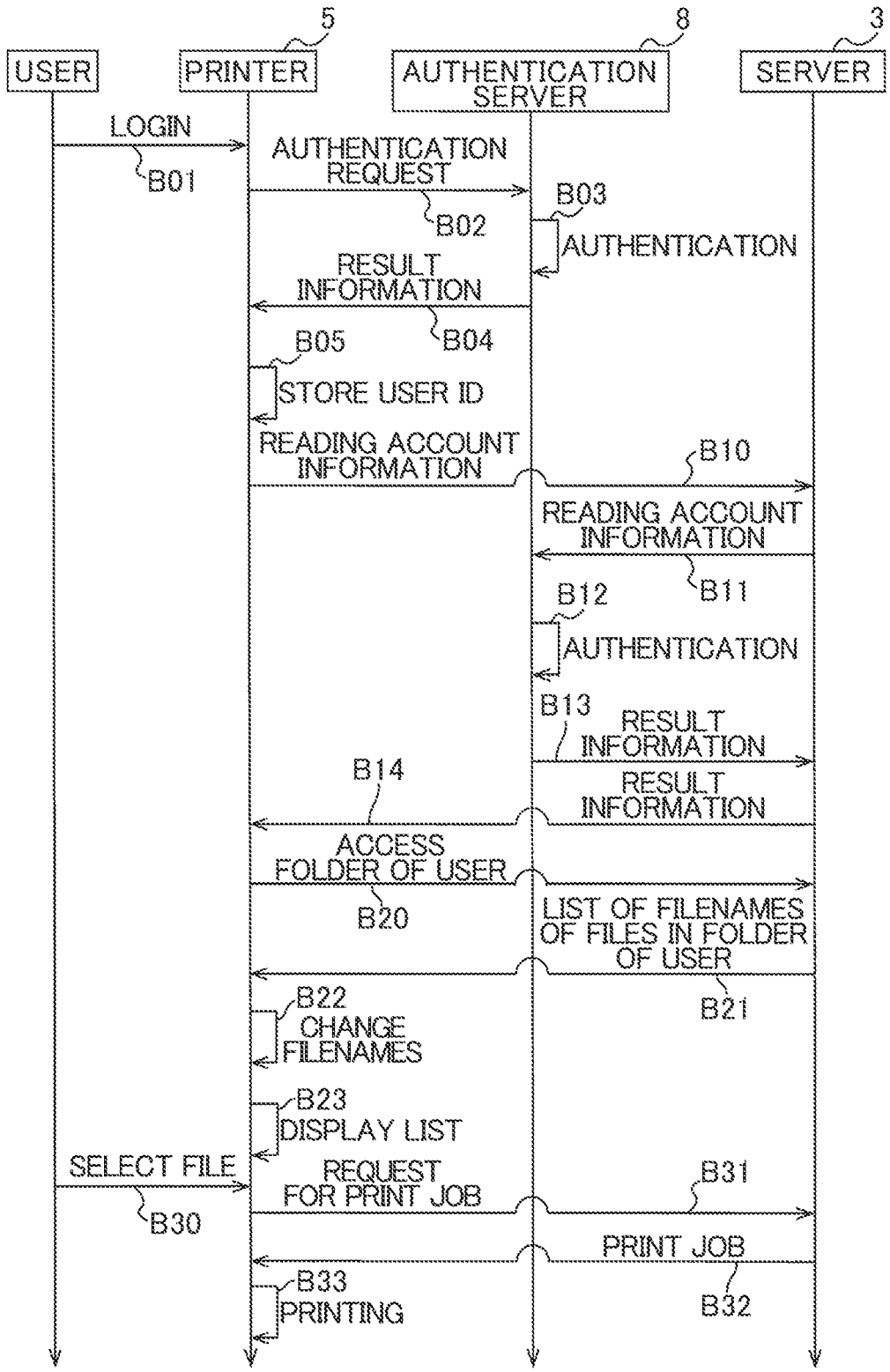

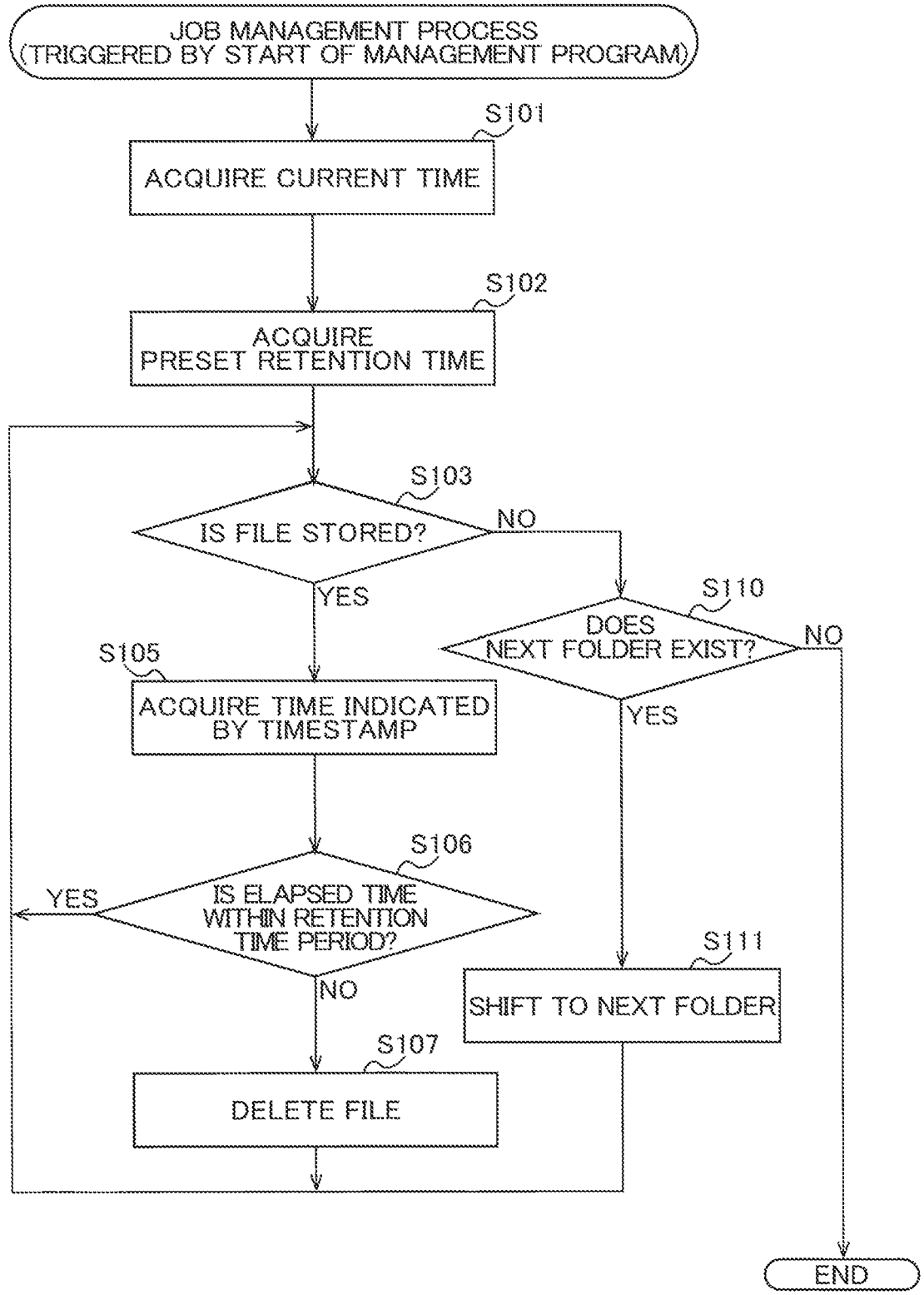

PRINTING SYSTEM INCLUDING SERVER AND PRINTER PRINTING IMAGE BASED ON PRINT JOB STORED IN THE SERVER

CROSS REFERENCE TO RELATED APPLICATION

This application claims priority from Japanese Patent Application No. 2020-164740 filed Sep. 30, 2020. The entire content of the priority application is incorporated herein by reference.

TECHNICAL FIELD

The present disclosure relates to a printer, and a printing system having a server connected to the printer and a client device.

BACKGROUND

A conventional printing system possesses a server device that is connected to printers and client devices. On one such printing system, the client devices store print jobs on the server device in association with user identification information. When a request for a print job is received from a printer, the server device transfers the print job to the printer. Upon receiving the print job from the server device, the printer performs a printing operation based on the print job.

SUMMARY

Since a plurality of users are expected to use the printing system described above, the server device in the printing system could accumulate a large number of print jobs. Thus, when the server device receives a request from a printer for a print job, the process of extracting the print job stored by the user of the printer from among the large number of print jobs accumulated on the server device may take a considerable amount of time. Therefore, it is desirable to reduce the processing load on the server device for extracting print jobs.

In view of the foregoing, it is an object of the present disclosure to provide a technology that reduces the processing load required for extracting print jobs in a printing system having a server device connected to printers and client devices.

In order to attain the above and other objects, the disclosure provides a printing system. The printing system includes a printer, a server device, and a client device. The printer includes a printer user interface. The server device is configured to communicate with the printer. The client device is configured to communicate with the server device, and includes a client-device user interface. The client device is configured to perform: receiving identification information of a user via the client-device user interface; and transmitting a print job for an image to be printed to the server device, the print job being associated with a computer name, the computer name specifying the client device and being assigned to the received identification information. The server device is configured to perform: storing, in a case that the server device receives the print job transmitted from the client device, the print job in a specific folder having a name corresponding to the identification information to which the computer name is assigned and which is associated with the print job. The printer is configured to perform: searching, after the printer receives the identification information via the printer user interface, a folder provided in the server device to find the specific folder which has the name corresponding to the inputted identification information; receiving selection of a print job to be printed via the printer user interface from among one or more print jobs stored in the found folder; receiving the selected print job from the server device; and printing an image based on the received print job.

According to another aspect, the disclosure provides a printer. The printer includes a printing unit, a user interface, a communication interface, and a compute. The communication interface is configured to communicate with a server device. The computer is configured to perform: a receiving process to receive identification information of a user inputted via the user interface; a selection process to search a folder provided in the server device to find a specific folder which has a name corresponding to the inputted identification information, to display one or more print jobs stored in the found specific folder on the user interface, and to receive selection of a print job to be printed from among the displayed one or more print jobs, wherein the client device is configured to perform: receiving the identification information of a user via a client-device user interface; and transmitting a print job for an image to be printed to the server device, the print job being associated with a computer name, the computer name specifying the client device and being assigned to the received identification information, wherein the server device is configured to perform storing, in a case that the server device receives the print job transmitted from a client device, the print job in the specific folder having the name corresponding to the identification information to which the computer name is assigned and which is associated with the print job; and a printing process to receive the selected print job selected in the selection process from the server device and to control the printing unit to perform printing based on the received print job.

BRIEF DESCRIPTION OF THE DRAWINGS

The particular features and advantages of the disclosure as well as other objects will become apparent from the following description taken in connection with the accompanying drawings, in which:

FIG. 4 is a sequence diagram illustrating a second procedure to execute printing based on a print job stored in the shared folder;

FIG. 6 is a flowchart illustrating a job management process.

DETAILED DESCRIPTION

Next, a printing system according to an embodiment of the present disclosure will be described while referring to the accompanying drawings. In the printing system according to this embodiment, printers are controlled using personal computers (hereinafter abbreviated as "PC") to execute printing operations.

Figure 1:
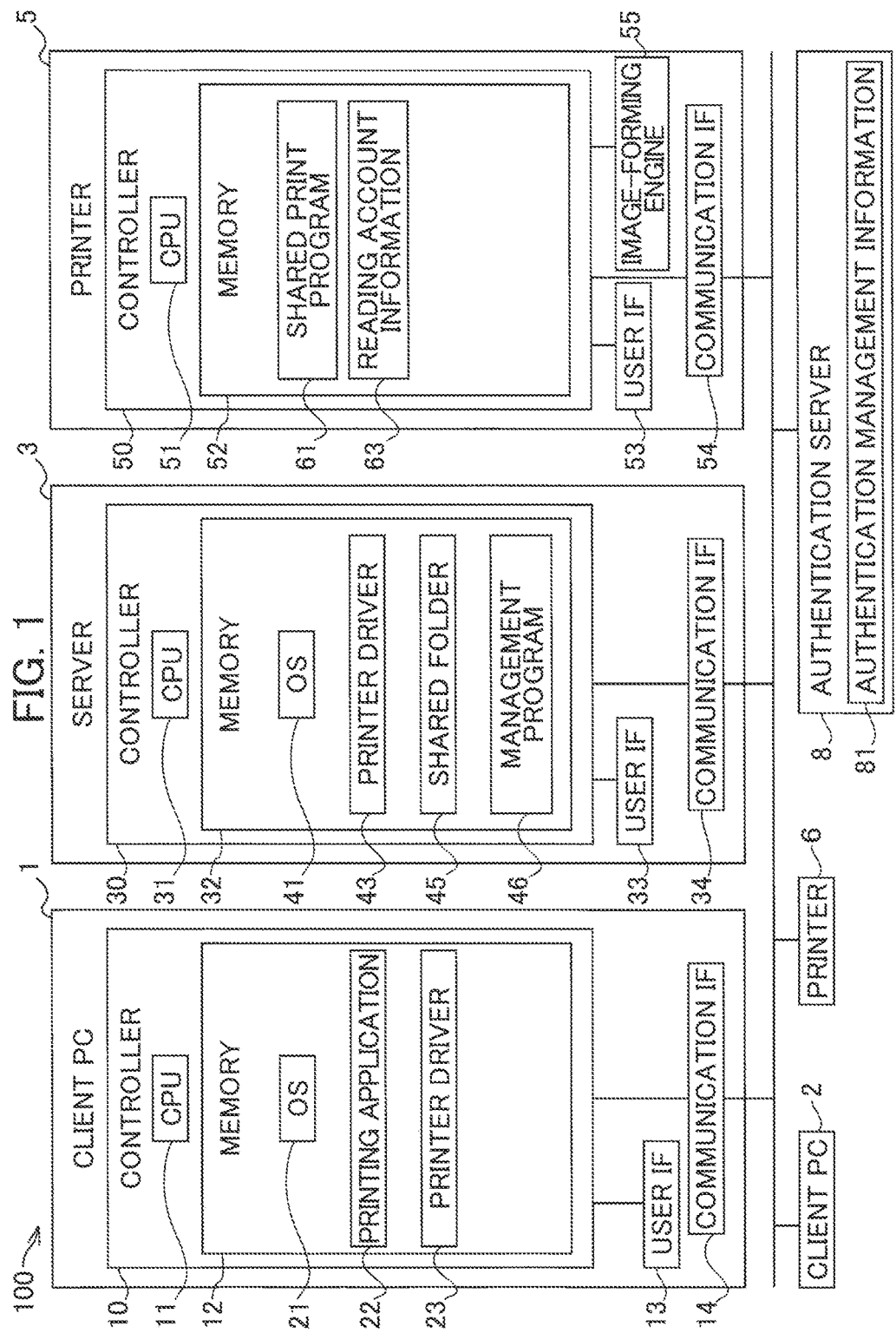
FIG. 1 is a block diagram illustrating an electrical structure of a printing system according to an embodiment.

FIG. 1 shows a printing system 100. The printing system 100 includes a plurality of client PCs 1 and 2, a server 3, a plurality of printers 5 and 6, and an authentication server 8. The client PCs 1 and 2 are examples of the client device. The server 3 is an example of the server device. The client PCs 1 and 2 are connected to the server 3 and capable of communicating with the same. The server 3 is connected to each of the printers 5 and 6 and capable of communicating with the same. The authentication server 8 is connected to each of the client PCs 1 and 2, the server 3, and the printers 5 and 6. The client PCs 1 and 2 may or may not be capable of communicating with the printers 5 and 6.

The client PCs 1 and 2 in the embodiment are similar devices that perform similar operations and processes. The client PC 1 will serve as the representative PC in the following example. Additionally, the printers 5 and 6 in the embodiment are similar devices of the same model that perform similar operations and processes. The printer 5 will be used as the representative printer in the following description.

The client PC 1 of the embodiment has at least a function for receiving a print instruction through a user operation, and a communication function. As shown in FIG. 1, the client PC 1 is provided with a controller 10 that includes a CPU 11 and a memory 12. The client PC 1 is also provided with a user interface 13, and a communication interface 14. The user interface 13 and the communication interface 14 are electrically connected to the controller 10. Note that the controller 10 in FIG. 1 and the controllers of other devices described later are a general concept that covers all hardware and software used for controlling the client PC 1 or the like and does not actually represent a single piece of hardware present in the client PC 1 or the like.

The CPU 11 executes various processes according to programs read from the memory 12 or based on user operations. The memory 12 is a storage area for storing various programs and various data. The programs stored in the memory 12 include a startup program for starting up the client PC 1, and various application programs that is for using the printers 5 and 6. The data stored in the memory 12 include image data and document data. The memory 12 is used as a work area for executing various processes.

Examples of device memory such as the memory 12 may be a built-in ROM, RAM, hard disk drive, or the like or may be any storage medium that is readable and writable by the CPU 11 and etc. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The user interface 13 includes hardware for displaying screens that report information to the user, and hardware for receiving operations performed by the user. The user interface 13 may have a touchscreen that is provided with both a display function and a function for receiving operations, or may be a set of devices that include a display provided with a display function and a keyboard, mouse, trackball, or the like provided with operation-receiving functions.

The communication interface 14 includes hardware for communicating with external devices such as the server 3. The communication method of the communication interface 14 may be wired or wireless and may conform to any of various communication standards, such as Ethernet (registered trademark) and Wi-Fi (registered trademark). The client PC 1 may include a plurality of communication interfaces conforming to respective ones of a plurality of communication standards.

As shown in FIG. 1, the memory 12 of the client PC 1 stores various data and various programs that include an operating system (hereinafter "OS") 21, a printing application 22, and a printer driver 23. The OS 21 may be Windows (registered trademark), macOS (registered trademark), iOS (registered trademark), Android (registered trademark), or Linux (registered trademark), for example.

The printing application 22 is used for creating or editing document data or image data, for example, and can receive a print instruction from the user. The printer driver 23 is a program that supports the printers 5 and 6, and generates print data for executing various processes for controlling the printers 5 and 6 to execute a printing operation. For example, the printer driver 23 generates a print job including print data available to the printers 5 and 6 when executing a printing operation.

The server 3 according to the embodiment is a device having at least a function for storing various data such as print data (or print job), and a communication function. As shown in FIG. 1, the server 3 is provided with a controller 30 that includes a CPU 31 and a memory 32. The server 3 is also provided with a user interface 33, and a communication interface 34, both of which are electrically connected to the controller 30. The electrical structure of the server 3 is similar to that described for the client PC 1.

As shown in FIG. 1, the memory 32 of the server 3 stores various data and various programs including an OS 41, a printer driver 43, a shared folder 45, and a management program 46. The OS 41 may be Windows (registered trademark), macOS (registered trademark), or Linux (registered trademark), for example.

The printer driver 43 is a similar program to the printer driver 23 provided on the client PC 1 for supporting the printers 5 and 6. The shared folder 45 is a folder made available on a network through a function of the OS 41. The shared folder 45 is accessible from external devices of the server 3, such as the client PCs 1 and 2 and the printers 5 and 6. As will be described later, a folder for each user is provided in the shared folder 45. Additionally, user permissions specifying accessibility are set for each user folder in the shared folder 45. The management program 46 is provided for managing files stored in the shared folder 45.

The printer 5 in the embodiment is a device shared among users of the printing system 100. The printer 5 has at least a function for printing images based on print data, and a communication function. As shown in FIG. 1, the printer 5 is provided with a controller 50 that includes a CPU 51, and a memory 52. The CPU 51 is an example of a computer. The printer 5 is also provided with a user interface 53, a communication interface 54, and an image-forming engine 55, which are all three electrically connected to the controller 50. The image-forming engine 55 is an example of a printing unit.

The user interface 53 is a touchscreen, for example, that includes hardware to display screens that report information to the user, and hardware to receive operations performed by the user. Alternatively, the user interface 53 may be a set of components including a screen for displaying information, and input buttons. The communication interface 54 includes hardware to communicate with external devices such as the server 3. The communication interface 54 may employ any type of communication standard and mode of communication.

The memory 52 of the printer 5 stores various programs and data, including a shared print program 61, and reading account information 63. The shared print program 61 is provided for reading any print job stored in the shared folder 45 on the server 3 and executing a print based on the print job. The reading account information 63 is account information on a user that has read permission for at least all folders and files in the shared folder 45 on the server 3. For example, the reading account information 63 may be account information on a user having administrator privileges on the printing system 100. Through use of the reading account information 63, the printer 5 can search all folders in the shared folder 45 on the server 3 and can receive all print jobs stored in each folder.

The authentication server 8 is provided with authentication management information 81 and functions to authenticate users based on requests received from the client PCs 1 and 2, the server 3, the printers 5 and 6, and the like in the printing system 100. The authentication server 8 performs authentication based on the authentication management information 81 and authentication information included with an authentication request received from the above devices and returns result information indicating whether authentication was successful to the device that transmitted the authentication request.

The printing system 100 in the embodiment employs an authentication system using Active Directory (trademark), for example. Authentication information for each user of the printing system 100 is registered in the authentication server 8. The registered authentication information includes identification information for the user. The user of each device in the printing system 100 inputs authentication information of the user registered in the authentication server 8 into the device as login information. The device then transmits this login information to the authentication server 8. In a case that the result information subsequently received from the authentication server 8 indicates that authentication was successful, the device accepts the user login. Here, the reading account information 63 stored on the printer 5 is a portion of the authentication information registered in the authentication server 8.

The printing system 100 according to the embodiment can execute a procedure in which the client PCs 1 and 2 store print jobs in the shared folder 45 on the server 3 and subsequently the printers 5 and 6 read and print the print jobs stored on the server 3.

Procedures and steps described below are basically processes according to the programs executed by the CPU 11, 31, and 51. In the following description, actions such as "determine," "extract," "select," "calculate," "decide," "identify," "acquire," "receive," "control," and the like represent processes performed by the CPUs. Processes performed by the CPU include processes that control hardware through an API provided in the OS of each device. In the following descriptions, abbreviated expressions such as "the program B controls the hardware C" may indicate "the program B controls the hardware C by using the API of the OS." Processes performed by the CPU according to instructions described in a program may be described in abbreviated terms, such as "the CPU executes," or "the program A executes."

Note that the term "acquire" in this specification is used as a concept that does not necessarily require a request. In other words, a process by which the CPU receives data without requesting that data is included in the concept of "the CPU acquires data." The term "data" described herein is expressed as bit strings that can be read by a computer. Data of different formats are treated as the same data when the content of the data is essentially the same. The same holds true for "information" in this specification. A "request," an "instruction," or the like is processed by outputting information indicating the "request," or the "instruction" to a communication target. The terms "request," and "instruction" may also be used to describe information indicating a "request," and an "instruction."

Further, a process performed by each CPU to determine whether information A indicates circumstance B may be described conceptually as "determining whether circumstance B based on information A." A process in which each CPU determines whether information A indicates circumstance B or circumstance C may be described conceptually as "determining whether circumstance B or circumstance C based on information A."

Figure 2:
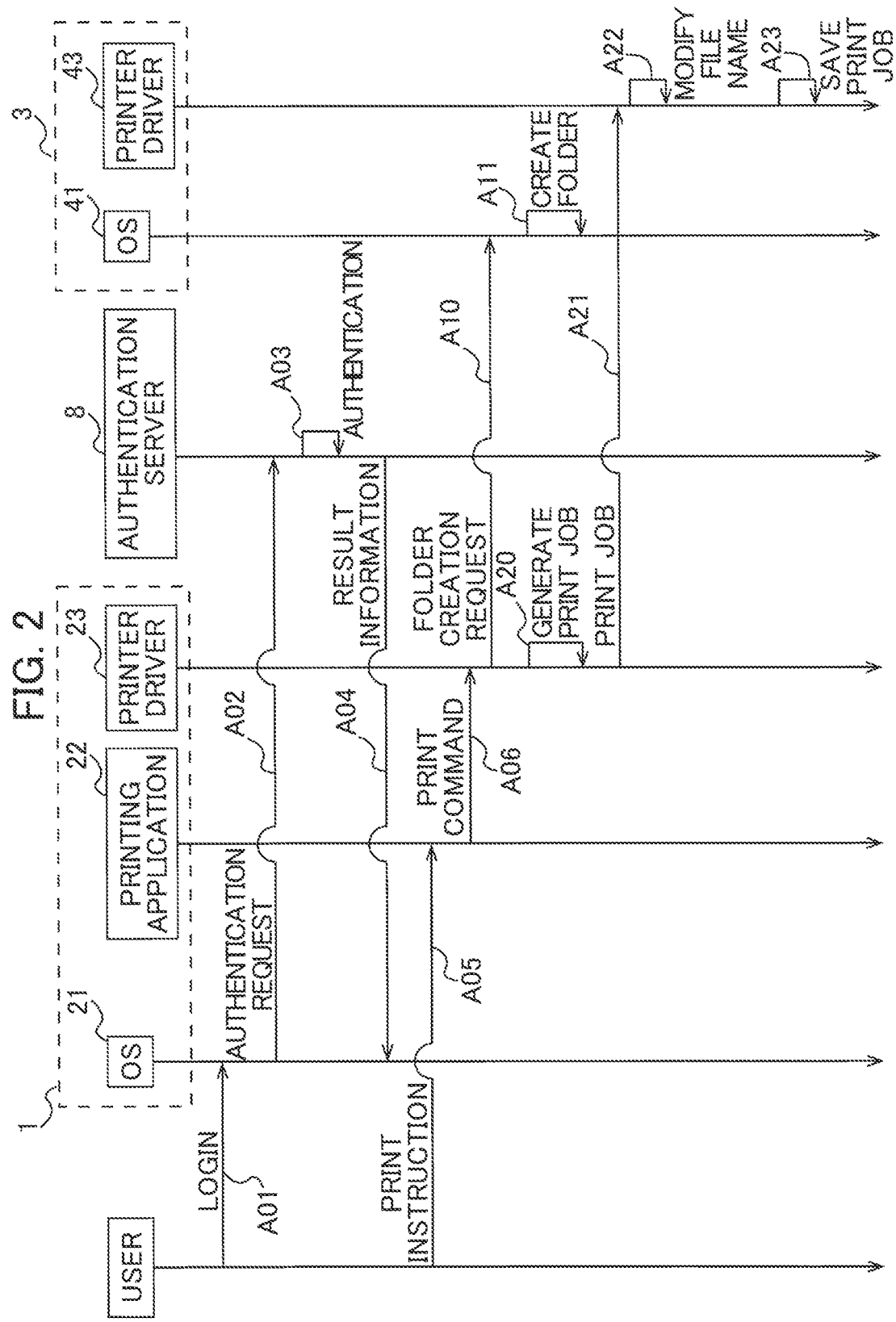
FIG. 2 is a sequence diagram illustrating a first procedure to store a print job in a shared folder of a server.

A first procedure in which a print job is stored in the shared folder 45 of the server in the printing system 100 will described while referring to a sequence diagram illustrated in FIG. 2.

In the first procedure, in A01 the user logs in to the client PC 1. Specifically, the user inputs login information via the user interface 13 of the client PC1. The login information is an example of the authentication information. The login information includes a user ID. For example, the login information includes a set of the user ID and a password. For example, the user ID is a personal name, account name, or employee number of the user. The user ID is an example of the identification information for identifying individual user. The login information may be information inputted by reading an ID card, a finger print, or a palm pattern.

In A02 the OS 21 of the client PC 1 transmits the received login information and an authentication request to the authentication server 8. In A03 the authentication server 8 executes authentication based on the received login information and authentication management information 81, in A04 transmits result information indicating a result of the authentication to the client PC1. When the received login information has been registered in the authentication management information 81 for example, the authentication server 8 transmits the result information indicating that the authentication was successful to the client PC1. In a case that the result information indicates that the authentication is successful, the user can use the client PC1, and instruct printing through the printing application 22, for example. In a case that the result information indicates that the authentication failed, the OS 21 displays the information indicating the authentication failed, and receives again the login information, for example.

When login is successful, in A05 the user starts the printing application 22 and inputs a print instruction into the printing application 22. For the case described in the embodiment, a print instruction for printing on a shared printer such as the printer 5 or 6 is inputted through the printing application 22. In A06, the printing application 22 transfers a print command to the printer driver 23 based on the print instruction. The print command includes image data representing the image to be printed, and parameters related to printing.

In A10 the printer driver 23 transmits a folder creation request to the OS 41 of the server 3. The folder creation request includes the user ID of the login user currently logged in to the client PC1. The printer driver 23 instructs the server 3 to create a folder having a folder name corresponding to the user ID in the shared folder 45 in the server 3. The user ID is included in the login information received in A01, and information registered in the authentication management information 81 of the authentication server 8. The folder name of the folder to be created is set so as to be in one-to-one correspondence with the user ID. For example, the folder name of the folder to be created is a name the same as the user ID, a name having a user ID and some additional information, or a name obtained by modifying the user ID according to a prescribed rule.

Figure 3:
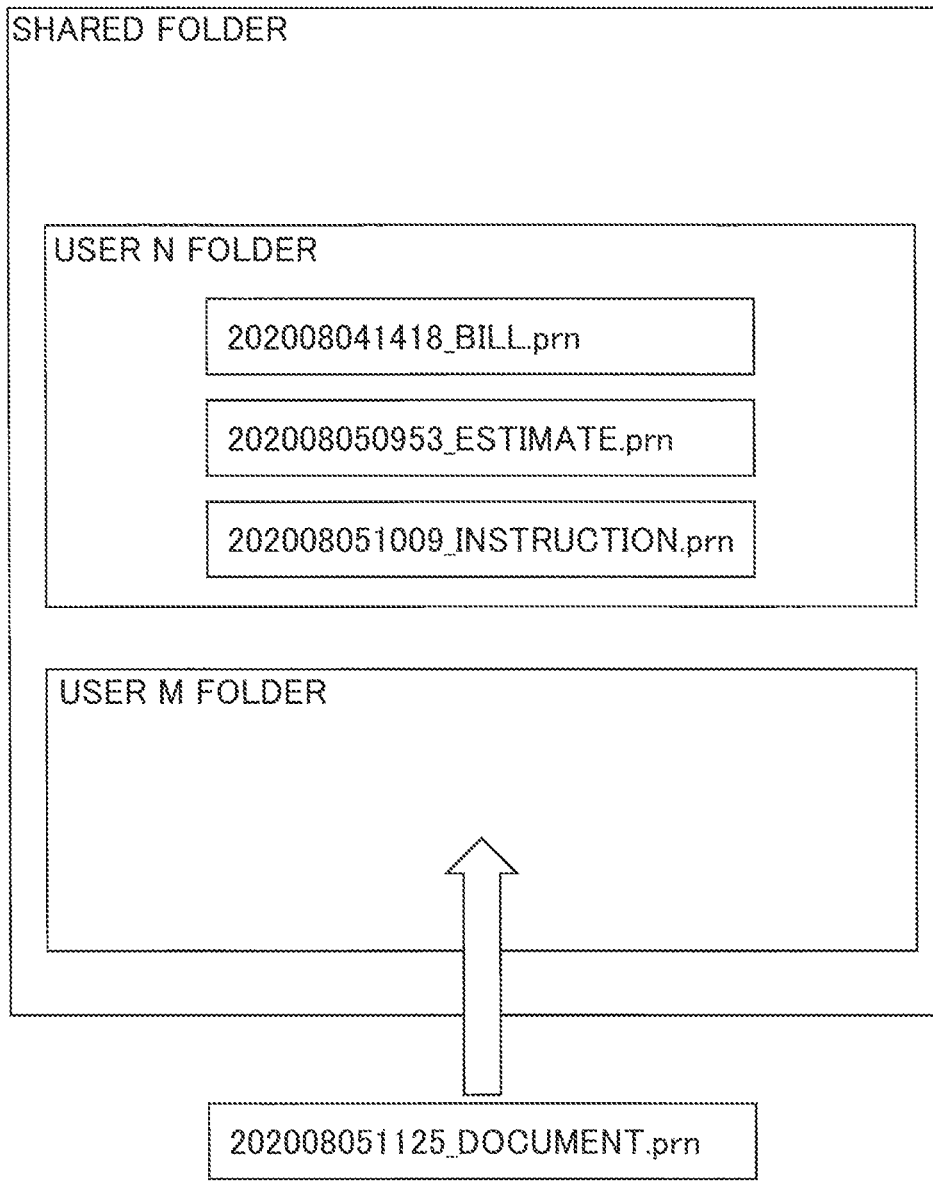
FIG. 3 is an explanatory diagram illustrating a folder structure of the shared folder.

In A11 the OS 41 creates a folder having the designated folder name (the folder name corresponding to the user ID) in the shared folder 45. In a case that in A10 the printer driver 23 instructs to create a folder having a folder name "User M", the OS 41 creates the "User M" folder 452 in the shared folder 45 as shown in FIG. 3 provided that the shared folder 45 does not store the folder having the folder name "User M" therein at this time. At a time when the "user M" folder 452 is created, the "User M" folder 452 is empty. In a case that the shared folder 45 already stores the "User M" folder 452 therein, the process of A11 is skipped. By repeating the creatin process of A11 for each user ID, folders having folder names corresponding to respective ones of the user IDs are provided in the shared folder 45 of the server 3.

Based on the print command received in A06, in A20 the printer driver 23 generates a print job. In A21 the printer driver 23 transmits the generated print job to the server 3 while designating the folder whose creation was requested in A10 (A21). Specifically, the printer driver 23 stores the print job in a print queue specifying a shared printer, such as one of the printers 5 and 6, and the OS 21 transmits this print job to a print queue on the server 3 via the communication interface 14. The OS 41 of the server 3 transfers the print job received from the client PC 1 to the printer driver 43 corresponding to the printer 5 or 6.

Before transmitting the print job to the server 3, the OS 21 includes a PC name with the print job. The PC name is information specifying the client PC 1 itself and is assigned to identification information specifying the user currently logged in, such as the user ID included in the login information that was acquired in A01. For example, the PC name may include the user ID. Alternatively, the PC name may include information based on the user ID. The PC name of the client PC 1 is an example of the computer name. Further, the print job transmitted to the server 3 includes a filename configured of the name of the image to be printed, that is, the name of the image data representing the image to be printed. The image to be printed is the image received with the user's print instruction in A05.

Upon receiving this print job, in A22 the printer driver 43 modifies the filename for the print job by adding a timestamp to the filename as a prefix. The timestamp is information specifying the current date and time and is an example of the sequence information. For example, if the filename for the print job is "document.prn" and the current date and time is 11:25 on Aug. 5, 2020, the printer driver 43 modifies the filename of the print job to the name "202008051125_document.prn," as shown in FIG. 3.

Next, in A23 the printer driver 43 saves the print job with the modified filename in the folder whose name corresponds to the user ID that is included in the PC name included with the print job. For example, the printer driver 43 stores the print job in the "User M" folder 452 created in A11. The permissions set for the printer driver 43 allow the printer driver 43 to write files to the shared folder 45. Since there is a high probability that A23 will be executed directly after A22, the timestamp added in A22 is an example of information indicating the save time for the print job.

Note that the prefix added to the filename in A22 is not limited to a timestamp but may be a simple consecutive number for each folder stored in order. For example, the printer driver 43 may save the number of print jobs stored in the server 3 for each user ID and may set the prefix for the current print job to a value obtained by incrementing this saved number by 1. Alternatively, the printer driver 43 may acquire the prefix for each print job already stored in the folder to which the current print job will be stored and may set the prefix of the current print job to a value found by incrementing the largest prefix among the acquired prefixes by 1. The prefix may also be a consecutive number assigned in order to each print job received by the server 3, regardless of the folder used to store print jobs. The consecutive number is an example of the order information.

Alternatively, the prefix may be information added to a print job on the client PC 1. That is, the client PC 1 may add timestamp information to the print job prior to transmitting the print job to the server 3. When the server 3 receives the print job with timestamp information included, the server 3 may set the prefix based on the timestamp information included in the print job. For example, the printer driver 23 of the client PC 1 may add a timestamp specifying the current date and time to a print job when generating the print job. In a case that the timestamp added to the print job in A22 is the timestamp added to the print job on the client PC 1, this timestamp is an example of information specifying the generation time of the print job.

Further, the process of modifying a filename by adding a prefix may be performed by the printer driver 23 of the client PC 1. Thus, in a case that the printer driver 43 of the server 3 receives a print job having a filename with a prefix already added, the printer driver 43 may skip A22. Adding the prefix on the client PC 1 can reduce the processing load on the server 3.

Note that prior to creating a folder in A11, the server 3 may first confirm whether the user ID is registered in the authentication server 8. In this case, the server 3 may avoid creating a folder corresponding to a user ID not registered in the authentication server 8 and storing a print job in that folder.

Next, a second procedure will be described with reference to FIG. 4. In the second procedure, a print job stored on the server 3 is read and printed by the printer 5. The process performed by the printer 5 in the second procedure is a process based on the shared print program 61.

At the beginning of the second procedure, in B01 the user inputs login information to the printer 5 via the user interface 53 of the printer 5 to logs in the printer 5. The printer 5 receives the inputted login information. The process performed on the printer 5 for receiving the inputted login information in B01 is an example of the reception process.

In B02 the printer 5 transmits the inputted login information and an authentication request to the authentication server 8. In B03 the authentication server 8 performs authentication based on the login information received from the printer 5 and the authentication management information 81, and in B04 transmits result information indicating the authentication result to the printer 5. In a case that the result information received from the authentication server 8 indicates that authentication was successful, in B05 the printer 5 stores the user ID included in the login information inputted via the user interface 53 in the memory 52. In a case that the result information received from the authentication server 8 indicates that authentication failed, the printer 5 does not accept any further operations.

In B10 the printer 5 requests to access the server 3 by transmitting the reading account information 63 stored in the memory 52 to the server 3. In B11 the server 3 transmits the reading account information 63 received from the printer 5 and an authentication request to the authentication server 8. In B12 the authentication server 8 performs authentication based on the reading account information 63 received from the server 3 and the authentication management information 81, and in B13 transmits result information indicating the result of the authentication to the server 3. In B14 the server 3 transmits the result information received from the authentication server 8 to the printer 5.

As described above, the reading account information 63 is stored in the memory 52 of the printer 5 in advance. The reading account information 63 is information on an account presumed to have been registered in the authentication server 8. The reading account information 63 is also information on the account that has been granted read permission for reading all folders and files in the shared folder 45 on the server 3. The authentication server 8 may add information on permissions granted to the reading account information 63 with the result information on authentication success when transmitting the result information to the server 3. Accordingly, the printer 5 shifts to a state in which the authentication by the authentication server 8 is successful, and the server 3 allows access from the printer 5 within the scope of the permissions granted to the reading account information 63. By storing the reading account information 63 on the printer 5 in advance in the embodiment, login information can be set with great flexibility, without being limited by permissions for the received login information.

Note that the printer 5 may use the login information received in B01 in place of the reading account information 63 to access the server 3. As with the reading account information 63 described above, the printer 5 can similarly access the server 3 using this login information when the login information is for an account having read permission for reading files and folders in the shared folder 45 on the server 3.

When authentication with the reading account information 63 was successful, in B20 the printer 5 accesses the folder in the shared folder 45 having the folder name corresponding to the user ID stored in B01. In other words, the printer 5 searches the plurality of folders in the shared folder 45 for a folder having a name associated with the user ID. Note that rather than using the user ID of the logged-in user as information for accessing the server 3, the printer 5 may use the user ID as a key for searching the folders.

Whether logging in to the client PC 1 or logging in to the printer 5, the user is authenticated by the authentication server 8 in the printing system 100 according to the embodiment. Therefore, the user uses the same authentication information registered in the authentication server 8 when logging in to both. By using common login information for both cases, the user ID associated with the login information inputted into the printer 5 in B01 is the same as the user ID used for creating the user's folder in the shared folder 45. Hence, the printer 5 can identify the user's folder name based on the user ID associated with the inputted login information.

After retrieving a folder having a folder name corresponding to the user ID, in B21 the printer 5 acquires from the server 3 a list of filenames for print jobs stored in the retrieved folder. The printer 5 may retrieve a folder by specifying the folder name, and the server 3 may extract files from the retrieved folder.

The server 3 creates a list of the files in the retrieved folder arranged in order of their filenames Since a prefix such as a timestamp is added to the filenames as described above, the files are arranged in order of their prefixes when the folder contains a plurality of files. Further, since the prefix is a timestamp or a consecutive number, the order of the prefixes is the order in which the files were stored in the folder. Hence, the list acquired by the printer 5 in B21 includes filenames arranged in their stored order.

Figure 5A:
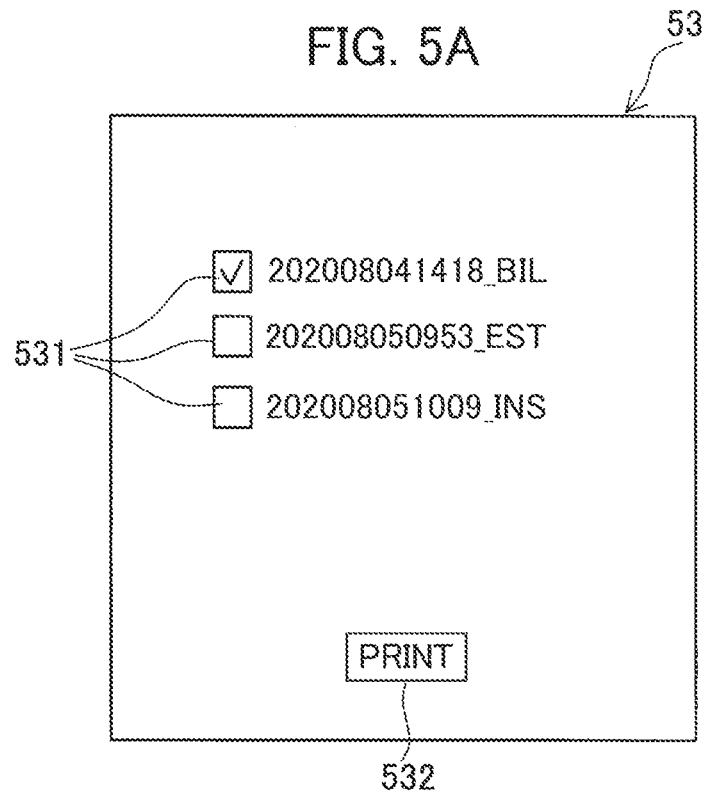
FIG. 5A is an explanatory diagram illustrating a conceivable screen to receive selection of a file.
Figure 5B:
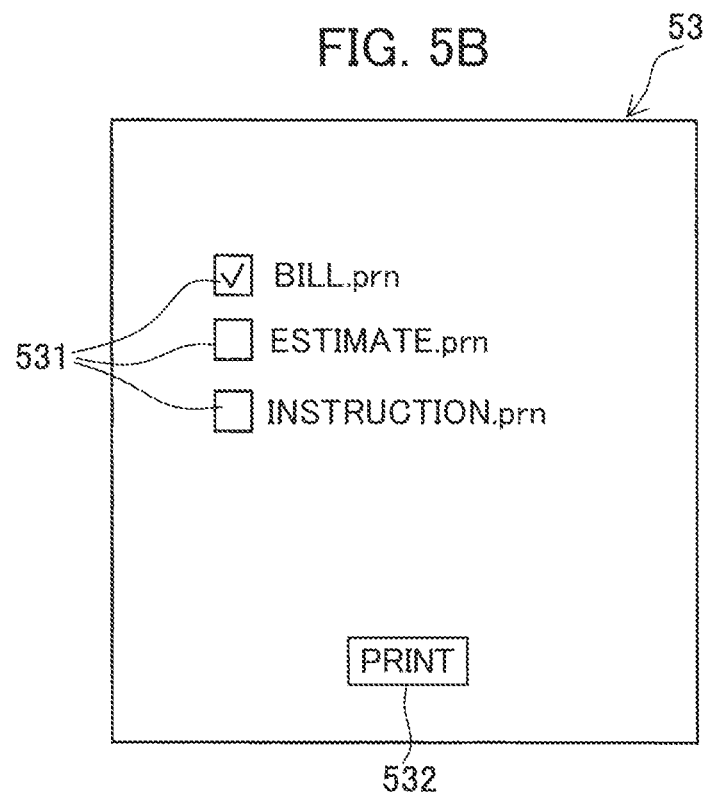
FIG. 5B is an explanatory diagram illustrating a screen to receive selection of a file according to the embodiment.

In B22 the printer 5 changes each filename in the list acquired from the server 3 to a name that excludes the prefix, and in B23 displays the list of modified filenames on the user interface 53. The prefixes are information added by the server 3 in A22 of the first procedure (see FIG. 2) and are not names intended by the user. Further, in the case of a timestamp, the prefix will likely be a numeric string having a large number of digits, as in the example of FIG. 3. When the user interface 53 is limited in the number of characters that can be displayed in one line, the entire filename assigned by the user may not be displayable if the prefix is left in the filename, as illustrated in the example of FIG. 5A. By removing the prefix, only the filename designated by the user when storing the file is displayed, as illustrated in FIG. 5B. This method makes the display of filenames more understandable to the user. Note that FIG. 5B shows a sample list displayed when the files for User N shown in FIG. 3 were acquired. Additionally, in B22 the printer 5 may generate correlation data which correlates between the modified filenames and the filenames received in B21.

In B30 the user selects a file to be printed from the displayed list and the printer 5 receives this selection. The user selects the modified filename, which is modified in B22, for a file the user wishes to print from the list of filenames displayed on the user interface 53. The modified filename may be thought of a name specifying the print job. The modified filename may be also thought of a name specifying an image which is a potential print target. The process for receiving a user selection for a file is an example of the selection process. When the folder corresponding to the user contains no print jobs to be printed, the printer 5 displays a message in B23 indicating that no files are present, and the procedure in FIG. 4 ends without executing the remaining steps from B30.

The display for the list of filenames includes checkboxes 531 for receiving a selection for each file, and a print button 532 for receiving a print instruction for the selected files, as illustrated in the example of FIG. 5B. The user enters a check in the checkboxes 531 next to filename which the user wishes to print and then operates the print button 532.

The printer 5 modifies only the filenames in B22 without changing the order of filenames in the list acquired from the server 3 and in B23 displays the modified filenames. Therefore, the list displayed in B23 has the same order as the order of filenames in the list received from the server 3, i.e., the order in which files were stored. When the filenames are displayed in the order that the files were stored, the user can readily recognize the most recent files. Hence, this method facilitates the user in selecting desired files for printing, even if the user had issued a print instruction multiple times for files of the same name. This display of filenames may also include a Cancel button through which the printer 5 can receive an instruction to cancel a print job.

Further, in a case that the user interface 53 can display a large number of characters so that filenames with the added prefixes can be displayed in their entirety, the printer 5 may skip B22 and display the filenames in the list received from the server 3 unchanged.

After the user has selected a filename and operated the print button 532, in B31 the printer 5 requests the print job corresponding to the selected filename from the server 3. At this time, the printer 5 requests the print job based on the filename before the filename was modified in B22. The printer 5 may acquire the filename before modification by referring to the correlation data generated in B22. In B32 the server 3 transmits the requested print job to the printer 5. Note that the printer 5 may also acquire the specified print job itself by reading the print job directly from the shared folder 45.

In B33 the printer 5 executes a print based on the print job received from the server 3 using the image-forming engine 55. B33 is an example of the printing process. In this way, the user can acquire printed matter for a print job that was stored in the server 3 using the client PC 1. After printing is complete, the printer 5 deletes the print job received from the server 3. The server 3 may automatically delete a print job read by the printer 5, or the printer 5 may transmit an instruction to the server 3 for deleting the print job from the server 3, and the server 3 may delete the print job based on this instruction.

Note that the printer 5 may receive selections for a plurality of files from the list of displayed filenames. When the user has selected a plurality of files, the printer 5 executes steps B31-B33 in order for each of the selected files.

Next, steps in a job management process performed on the server 3 will be described with reference to the flowchart in FIG. 6. The job management process is performed to manage files stored in the shared folder 45 on the server 3. The CPU 31 executes the job management process triggered by the management program 46 being started up. Note that the management program 46 may be a resident program that is started when the server 3 is started and that runs continuously on the server 3 in the background. Alternatively, the management program 46 may be started at periodic intervals, such as once a week, may be started when the shared folder 45 is accessed, or may be started in response to a user instruction.

In S101 at the beginning of the job management process, the CPU 31 acquires the current time. In S102 the CPU 31 acquires a preset retention time period. The retention time period is an example of the prescribed time period. The retention time period is an interval during which a file stored in the shared folder 45 is retained, i.e., not deleted, and may be a predetermined fixed value or a variable value received as a user setting. Further, the retention time period may be a common time period for all users or may be configurable for each user.

In S103 the CPU 31 checks each user folder created in the shared folder 45 in sequence to determine whether one or more files are stored in the folder. In a case that the CPU 31 determines that a file is present in the folder (S103: YES), in S105 the CPU 31 acquires the time indicated by the timestamp that was added to the file as a prefix. In S106 the CPU 31 determines whether the elapsed time from the time acquired in S105 specified by the timestamp to the current time acquired in S101 is within the retention time period acquired in S102.

In a case that the CPU 31 determines that the elapsed time exceeds the retention time period (S106: NO), in S107 the CPU 31 deletes this file. By automatically deleting print jobs that have exceeded their retention time period, the server 3 can reduce the load on the memory 32.

After deleting the file in S107 or when the CPU 31 determines in S106 that the elapsed time has not exceeded the retention time period (S106: YES), the CPU 31 returns to S103 and determines whether another file exists in the folder. In a case that the CPU 31 determines that another file exists in the folder, the CPU 31 repeats the process described above for comparing the elapsed time from the time indicated by the timestamp to the current time with the retention time period.

When there are no more files remaining in the folder or when the CPU 31 has determined that all files have been checked (S103: NO), in S110 the CPU 31 determines whether another unprocessed folder exists in the shared folder 45. When another unprocessed folder exists (S110: YES), in S111 the CPU 31 searches the next folder (one unprocessed folder) and returns to S103 to check each file stored in the folder, as described above. However, in a case that no more folders exist (S110: NO), the CPU 31 ends the job management process.

Through the job management process described above, the server 3 can prevent unneeded files from accumulating in the shared folder 45. Before deleting or after deleting a file, the server 3 may also notify the user of the file, the administrator of the printing system 100, or the like that the file is being deleted.

According to the printing system 100 of the embodiment described above, folders having folder names that correspond to user IDs of users are provided in the shared folder 45 on the server 3. The client PC 1 transmits to the server 3 a print job with which a PC name for the client PC 1 that includes the user ID for the user currently logged in is added. Upon receiving the print job, the server 3 stores the print job in the folder having a folder name that corresponds to the user ID. The printer 5 retrieves the folder having a folder name corresponding to an inputted user ID and extracts print jobs stored in that folder. Accordingly, the user can extract print jobs stored in the server 3 altogether. This method can lighten the processing load since the load required for extracting print jobs in this manner is less than when extracting print jobs from among all print jobs stored in the shared folder 45.

Further, in the embodiment the user employ a common user ID for different devices since each device is authenticated using a common authentication server 8. This method simplifies the management of devices in the printing system 100 and makes the printing system 100 more user-friendly since the user is not required to use a plurality of sets of authentication information.

Further, since the client PC 1 in the embodiment requests the creation of a folder by specifying a user ID and designates this folder as the storage destination for print jobs, the method of the embodiment can reduce the processing load on the server 3.

When the list of print jobs is displayed on the printer 5 in the embodiment, the names of images to be printed are arranged in order of their names Note sequence information is added as a prefix to the filename when the server 3 stores a print job. Accordingly, since the names of images to be printed are listed in order of this sequence information, print jobs are displayed in the order that they were stored. Thus, the list of print jobs is displayed in a manner that the user can readily understand, facilitating the user in selecting a desired print job. Further, since the printer 5 removes the sequence information from the names of print jobs received from the server 3 to display the names of the print jobs without the sequence information, the filenames are more recognizable to the user, enabling the user to easily select a desired filename.

The embodiment described above is merely an example, and the present invention is not intended to be limited by the example. It would be apparent to those skilled in the art that various improvements and modifications may be made to the technology disclosed in this specification without departing from the scope of the invention. For example, the devices in the specification may be of any number and are not limited to the numbers of devices shown in the drawings. Further, the client PCs are not limited to PCs but may be smartphones or tablet computers, for example.

Further, the printer may be any device having a printing function, such as a multifunction peripheral, a copy machine, or a facsimile machine. In a case that the printer possesses functions in addition to the function for shared printing as described in FIGS. 2 and 4, the printer may receive a selection for a function to use and may execute a process for shared printing upon receiving an instruction to use the shared printing function, for example. The printer may also limit the functions that can be used based on the user that is currently logged in. For example, some users may be permitted to use the printer but not permitted to utilize shared printing.

Further, while the printers 5 and 6 are the same model in the embodiments, the printing system may include printers of different models. In a case that printer drivers supporting these different models are different from one another, the server 3 may be provided with a shared folder for each model, and stores each print job in the corresponding shared folder. Further, a printer driver may be installed on the client PC 1 or the like for the printer used by the user of the client PC 1 or the like. Further, each printer may itself acquire a print job from the corresponding shared folder.

While the client PC 1 transmits a request to create a folder in the embodiment, the present disclosure is not limited to this method. For example, when the server 3 receives a print job from the client PC 1, the server 3 may acquire the user ID included in the computer name associated with this print job, determine whether a folder exists with a name that corresponds to the acquired user ID, and create a folder when a folder with such a name does not exist.

While both the client PC 1 and the printer 5 use the authentication server 8 for authenticating users in the embodiment, the present disclosure is not limited to this method. For example, the printer 5 may be provided with user information for all users capable of using the printer 5 and may itself perform login authentication using the user information. With this configuration, the user must still log in to the printer 5 using the user ID registered in the authentication server 8 when printing a print job stored in the shared folder 45.

While the server 3 executes the job management process in the embodiment, this process may be executed by the client PC 1 or 2. For example, a user who logged in to the client PC 1 or 2 may issue an instruction to instruct the client PC 1 or 2 to execute the job management process. When executing the job management process on the client PC 1 or 2, the client PC 1 or 2 accesses the server 3 using the user ID for the logged-in user. When the logged-in user possesses administrator privileges for the printing system 100, for example, the job management process executed by the client PC 1 or 2 can manage all files stored in all folders in the shared folder 45, as described in FIG. 6. However, when the logged-in user possesses user permissions for accessing only the user's own folder, the job management process executed by the client PC 1 or 2 can only manage files within the user's own folder.

In any of the flowchart and the sequence charts disclosed in the embodiments, the plurality of processes that make up any of the plurality of steps may be executed in parallel, or the order in which the processes are performed may be modified in any way that does not produce any inconsistencies in the processes.

The processes disclosed in the embodiment may be executed by a single CPU, a plurality of CPUs, an ASIC or other hardware, or a combination of these components. Further, the processes disclosed in the embodiment may be achieved through a storage medium that stores the programs used to implement those processes or according to any of various other methods or formats.

What is claimed is:

1. A printing system comprising:
    a printer including a printer user interface;
    a server device configured to communicate with the printer; and
    a client device configured to communicate with the server device, and including a client-device user interface,
    wherein the client device is configured to perform:
        receiving authentication information via the client-device user interface, the authentication information including identification information of a user;
        requesting an authentication server to execute first authentication using the received authentication information; and
        transmitting a print job for an image to be printed to the server device, the print job being associated with a computer name, the computer name specifying the client device and being assigned to the received identification information,
    wherein the server device is configured to perform:
        storing, in a case that the server device receives the print job transmitted from the client device, the print job in a specific folder having a name corresponding to the identification information to which the computer name is assigned and which is associated with the print job,
    wherein the printer is configured to perform:
        searching, after the printer receives the identification information via the printer user interface, a folder provided in the server device to find the specific folder which has the name corresponding to the inputted identification information;
        receiving selection of a print job to be printed via the printer user interface from among one or more print jobs stored in the found folder;
        receiving the selected print job from the server device; and
        printing an image based on the received print job,
    wherein the client device performs the transmitting a print job under a state that the first authentication is successful as a result of the requesting,
    wherein the computer name associated with the print job is assigned to the identification information which is included in the received authentication information, is used in the successful first authentication by the authentication server, and identifies the user currently logged in to the client device,
    wherein the printer stores account information to be authenticated by the authentication server, the account information having permission to receive the print job from the server device,
    wherein under a state that second authentication performed by the authentication server using the account information is successful, the printer performs the searching, the receiving selection of a print job, the receiving the selected print job, and the printing.

2. The printing system according to claim 1, wherein the printer is configured to further perform:
receiving the authentication information including the identification information via the printer user interface; and
requesting the authentication server to execute third authentication using the received authentication information,
wherein under a state that the third authentication performed by the authentication server using the received authentication information according to the requesting is successful and the second authentication performed by the authentication server using the account information is successful, the printer performs the searching, the receiving selection of a print job, the receiving the selected print job, and the printing.

3. The printing system according to claim 1, wherein the client device is configured to further perform:
transmitting to the server device, after the identification information is received via the client-device user interface, a creation request for creating the specific folder having the name corresponding to the received identification information,
wherein the server device is configured to further perform:
creating the specific folder in a case that the creation request is received,
wherein the client device performs the transmitting a print job with designating the specific folder which is created according to the creation request,
wherein the server device performs the storing the print job in the designated specific folder.

4. The printing system according to claim 1, wherein each of the one or more print jobs stored in the specific folder of the server device includes an image name of an image to be printed,
wherein the printer is configured to further perform:
displaying a list of one or more print jobs stored in the found specific folder on the printer user interface, the list showing one or more display names in an order of names, the one or more display names representing the one or more images of the one or more print jobs which are printing candidates,
wherein the printer performs the receiving selection of a print job from among the one or more print jobs indicated in the list.

5. The printing system according to claim 4, wherein for each of the one or more print jobs stored in the specific folder of the server device, the image name includes order information as a prefix thereof,
wherein the list shows the one or more display names in the order of names according to the order information.

6. The printing system according to claim 5, wherein each of the one or more display names shown in the list is obtained by deleting the prefix from the corresponding image name included in the print job.

7. The printing system according to claim 5, wherein the print job transmitted from the client device includes an initial name of an image to be printed,
wherein the server device is configured to further perform:
modifying the initial name in the print job received from the client device by adding the order information to the initial name, the print job with the modified name being stored in the specific folder.

8. The printing system according to claim 5, wherein the prefix is a consecutive number set for each folder stored in the server device, the consecutive number being incremented each time a file is stored in the folder,
wherein the list shows the one or more display names in the order of names according to the consecutive number.

9. The printing system according to claim 5, the prefix is a timestamp indicating a time at which the print job is generated or a time at which the print job is stored in the folder of the server device,
wherein the list shows the one or more display names in the order of names according to the timestamp.

10. The printing system according to claim 9, wherein either one of the client device and the server device is configured to perform:
acquiring the timestamp from the image name included in the print job which is stored in the server device; and
deleting the print job in a case that an elapsed time period from the time indicated by the timestamp to a current time is longer than a prescribed time period.

11. A printer comprising:
an image forming engine;
a user interface;
a communication interface configured to communicate with a server device; and
a computer configured to perform:
a receiving process to receive identification information of a user inputted via the user interface;
a selection process to search a folder provided in the server device to find a specific folder which has a name corresponding to the inputted identification information, to display one or more print jobs stored in the found specific folder on the user interface, and to receive selection of a print job to be printed from among the displayed one or more print jobs, wherein the client device is configured to perform: receiving the identification information of a user via a client-device user interface; and transmitting a print job for an image to be printed to the server device, the print job being associated with a computer name, the computer name specifying the client device and being assigned to the received identification information, wherein the server device is configured to perform storing, in a case that the server device receives the print job transmitted from a client device, the print job in the specific folder having the name corresponding to the identification information to which the computer name is assigned and which is associated with the print job; and
a printing process to receive the selected print job selected in the selection process from the server device and to control the image forming engine to perform printing based on the received print job,
wherein the selection process displays a list of one or more print jobs on the user interface, and receives selection of the print job from among the one or more print jobs in the list via the user interface,
wherein each of the one or more print jobs, which is received from the client device and stored in the specific folder of the server device, has an image name including order information as a prefix thereof,
wherein the list shows one or more display names representing the one or more print jobs in the order of names according to the order information, wherein each of the one or more display names shown in the list is obtained by deleting the prefix from the corresponding image name included in the print job.

12. A printing system comprising:
a printer including a printer user interface;
a server device configured to communicate with the printer; and
a client device configured to communicate with the server device, and including a client-device user interface,
wherein the client device is configured to perform:
receiving identification information of a user via the client-device user interface; and
transmitting a print job for an image to be printed to the server device, the print job being associated with a computer name, the computer name specifying the client device and being assigned to the received identification information,
wherein the server device is configured to perform:
storing, in a case that the server device receives the print job transmitted from the client device, the print job in a specific folder having a name corresponding to the identification information to which the computer name is assigned and which is associated with the print job,
wherein the printer is configured to perform:
searching, after the printer receives the identification information via the printer user interface, a folder provided in the server device to find the specific folder which has the name corresponding to the inputted identification information;
receiving selection of a print job to be printed via the printer user interface from among one or more print jobs stored in the found folder;
receiving the selected print job from the server device; and
printing an image based on the received print job,
wherein the client device is configured to further perform:
transmitting to the server device, after the identification information is received via the client-device user interface, a creation request for creating the specific folder having the name corresponding to the received identification information,
wherein the server device is configured to further perform:
creating the specific folder in a case that the creation request is received,
wherein the client device performs the transmitting a print job with designating the specific folder which is created according to the creation request,
wherein the server device performs the storing the print job in the designated specific folder.

13. The printing system according to claim 12, wherein each of the one or more print jobs stored in the specific folder of the server device includes an image name of an image to be printed,
wherein the printer is configured to further perform:
displaying a list of one or more print jobs stored in the found specific folder on the printer user interface, the list showing one or more display names in an order of names, the one or more display names representing the one or more images of the one or more print jobs which are printing candidates,
wherein the printer performs the receiving selection of a print job from among the one or more print jobs indicated in the list.

14. The printing system according to claim 13, wherein for each of the one or more print jobs stored in the specific folder of the server device, the image name includes order information as a prefix thereof,
wherein the list shows the one or more display names in the order of names according to the order information.

15. The printing system according to claim 14, wherein each of the one or more display names shown in the list is obtained by deleting the prefix from the corresponding image name included in the print job.

16. The printing system according to claim 14, wherein the prefix is a consecutive number set for each folder stored in the server device, the consecutive number being incremented each time a file is stored in the folder,
wherein the list shows the one or more display names in the order of names according to the consecutive number.

17. The printing system according to claim 14, the prefix is a timestamp indicating a time at which the print job is generated or a time at which the print job is stored in the folder of the server device,
wherein the list shows the one or more display names in the order of names according to the timestamp.

18. A printer comprising:
an image forming engine;
a user interface;
a storage;
a communication interface configured to communicate with a server device; and
a computer configured to perform:
a receiving process to receive identification information of a user inputted via the user interface;
a selection process to search a folder provided in the server device to find a specific folder which has a name corresponding to the inputted identification information, to display one or more print jobs stored in the found specific folder on the user interface, and to receive selection of a print job to be printed from among the displayed one or more print jobs, wherein the client device is configured to perform: receiving the identification information of a user via a client-device user interface; and transmitting a print job for an image to be printed to the server device, the print job being associated with a computer name, the computer name specifying the client device and being assigned to the received identification information, wherein the server device is configured to perform storing, in a case that the server device receives the print job transmitted from a client device, the print job in the specific folder having the name corresponding to the identification information to which the computer name is assigned and which is associated with the print job; and
a printing process to receive the selected print job selected in the selection process from the server device and to control the image forming engine to perform printing based on the received print job,
wherein the storage stores account information to be authenticated by an authentication server, the account information having permission to receive the print job from the server device,
wherein under a state that authentication performed by the authentication server using the account information is successful, the printer performs the selection process to search the folder provided in the server device to find the specific folder which has the name corresponding to the identification information inputted via the user interface.

19. The printer according to claim 18, wherein the client device is configured to perform:
- receiving authentication information via the client-device user interface, the authentication information including identification information of the user; and
- requesting the authentication server to execute second authentication using the received authentication information; and
- wherein the client device performs the transmitting a print job under a state that the second authentication is successful as a result of the requesting,
- wherein in a case that the server device receives the print job transmitted from the client device after the client device performs the transmitting a print job under the state that the second authentication is successful, the server device performs the storing the print job in the specific folder having the name corresponding to the identification information to which the computer name is assigned and which is associated with the print job.

20. The printer according to claim 18, wherein the client device is configured to further perform:
- transmitting to the server device, after the identification information is received via the client-device user interface, a creation request for creating the specific folder having the name corresponding to the received identification information, wherein the server device is configured to further perform:
- creating the specific folder in a case that the creation request is received, wherein the client device performs the transmitting a print job with designating the specific folder which is created according to the creation request, wherein the server device performs the storing the print job in the designated specific folder.

* * * * *